US006951346B2

(12) United States Patent
Brackett et al.

(10) Patent No.: US 6,951,346 B2
(45) Date of Patent: Oct. 4, 2005

(54) LOCKING TRAILER TONGUE EXTENSION ASSEMBLY

(75) Inventors: Wesley E. Brackett, 460 Sunset Dr., Lebanon, MO (US) 65536; Robin S. Talbot, Falcon, MO (US)

(73) Assignee: Wesley E. Brackett, Lebanon, MO (US)

(*) Notice: Subject to any disclaimer, the term of this patent is extended or adjusted under 35 U.S.C. 154(b) by 0 days.

(21) Appl. No.: 10/792,103

(22) Filed: Mar. 3, 2004

(65) Prior Publication Data
US 2005/0194762 A1 Sep. 8, 2005

(51) Int. Cl.[7] .................................... B60D 1/54
(52) U.S. Cl. .................. 280/491.2; 280/482; 280/422
(58) Field of Search ................... 280/491.2, 491.1, 280/491.5, 482, 420, 422

(56) References Cited

U.S. PATENT DOCUMENTS

| 3,951,444 A | | 4/1976 | Shull |
| 4,258,930 A | | 3/1981 | Hess |
| 4,459,832 A | | 7/1984 | Avrea |
| 4,571,964 A | | 2/1986 | Bratzler |
| 4,711,106 A | | 12/1987 | Johnson |
| 4,730,841 A | | 3/1988 | Ponder |
| 4,794,867 A | * | 1/1989 | Titz ............................... 105/3 |
| 5,011,176 A | * | 4/1991 | Eppinette ................. 280/479.3 |
| 5,199,733 A | | 4/1993 | DeLorme |
| 5,378,008 A | | 1/1995 | McCrossen |
| 5,410,893 A | | 5/1995 | Easterwood |
| 5,441,295 A | | 8/1995 | Smith |
| 5,503,423 A | | 4/1996 | Roberts |
| 5,580,076 A | * | 12/1996 | DeRoule et al. ......... 280/406.2 |
| 5,624,129 A | | 4/1997 | Clark, Jr. |
| 5,775,139 A | | 7/1998 | Sellers |
| 6,068,282 A | * | 5/2000 | Floe ........................... 280/482 |
| 6,155,587 A | | 12/2000 | Milazzo |
| 6,199,891 B1 | | 3/2001 | Bell et al. |
| 6,273,449 B1 | | 8/2001 | Harkcom et al. |
| 6,502,845 B1 | | 1/2003 | Van Vleet |
| 6,575,000 B1 | | 6/2003 | Li |
| 6,595,540 B1 | | 7/2003 | MacKarvich |
| 6,644,071 B2 | | 11/2003 | Gilbertson et al. |
| 6,648,361 B2 | | 11/2003 | Hulsey |

* cited by examiner

Primary Examiner—Kevin Hurley
(74) Attorney, Agent, or Firm—Lathrop & Gage, L.C.

(57) ABSTRACT

A trailer tongue extension assembly that includes a tubular trailer tongue, a removable extension, a first electrical connector disposed within the trailer tongue and a second electrical connector disposed within the removable extension. The first and second electrical connectors engage and disengage as the removable extension is installed or removed from the trailer tongue. A tongue pin is inserted either through registered holes in the tongue and the installed extension, or through aligned holes in the trailer tongue. A lock assembly secures the pin in the holes to, respectively, lock the extension on the trailer tongue or prevent the extension from being installed in the trailer tongue.

33 Claims, 4 Drawing Sheets

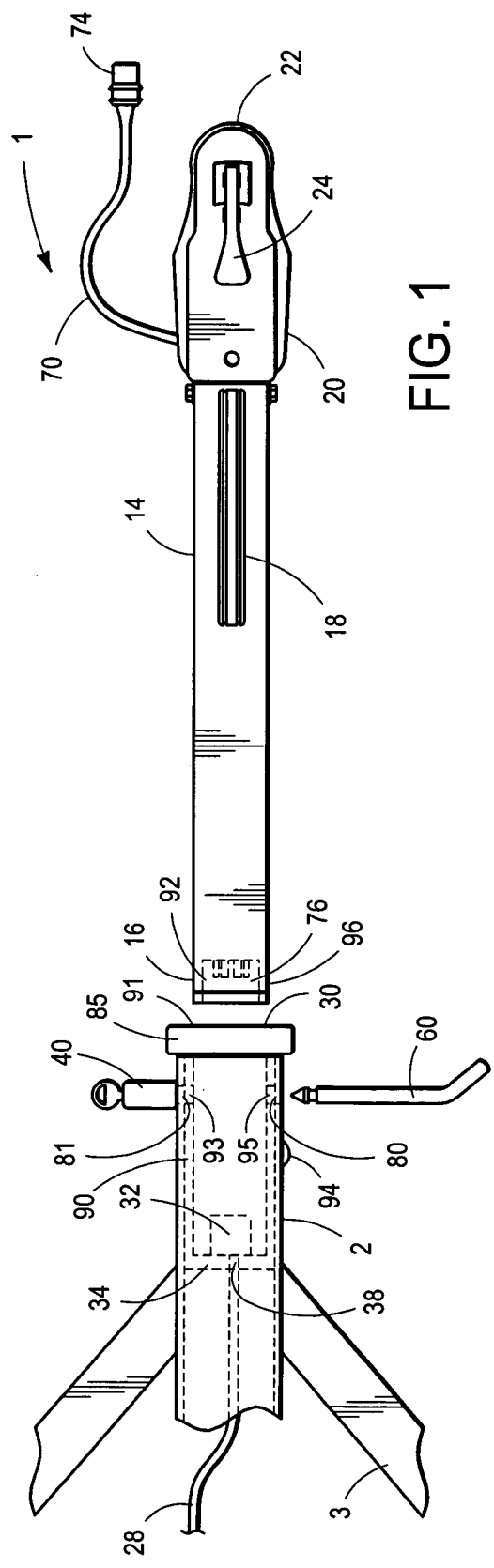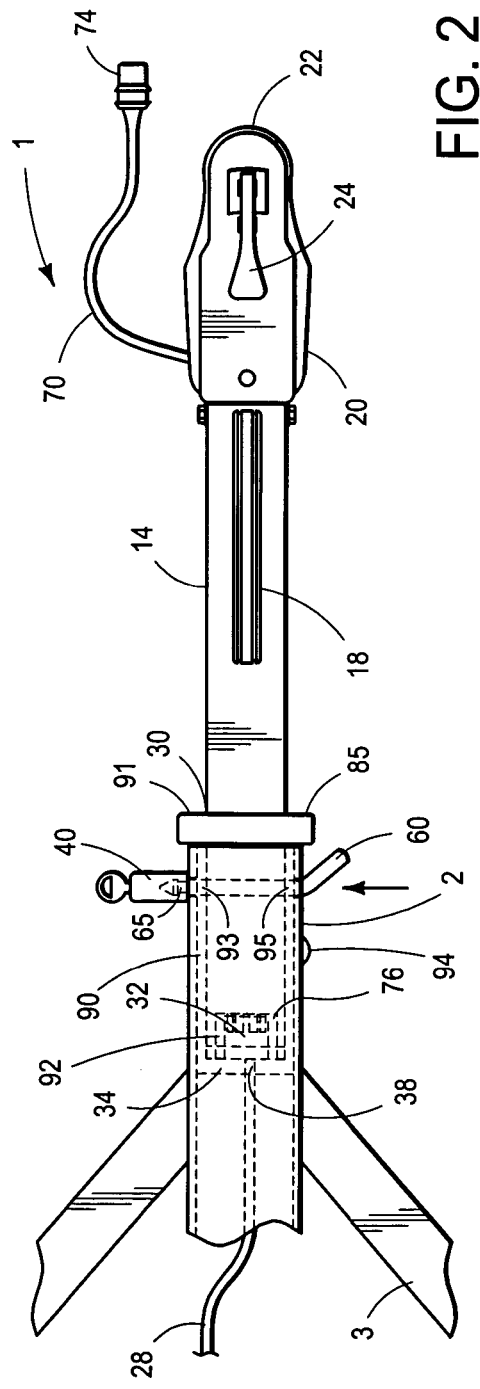

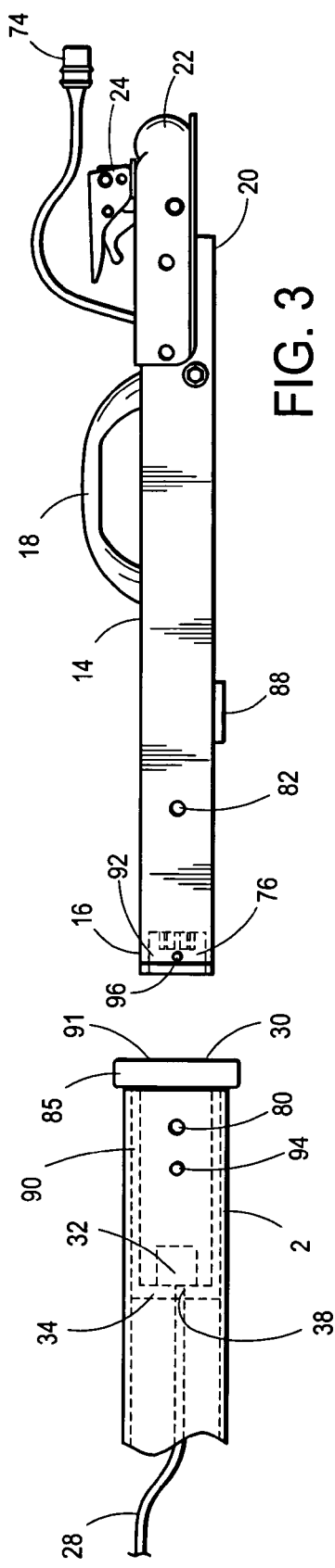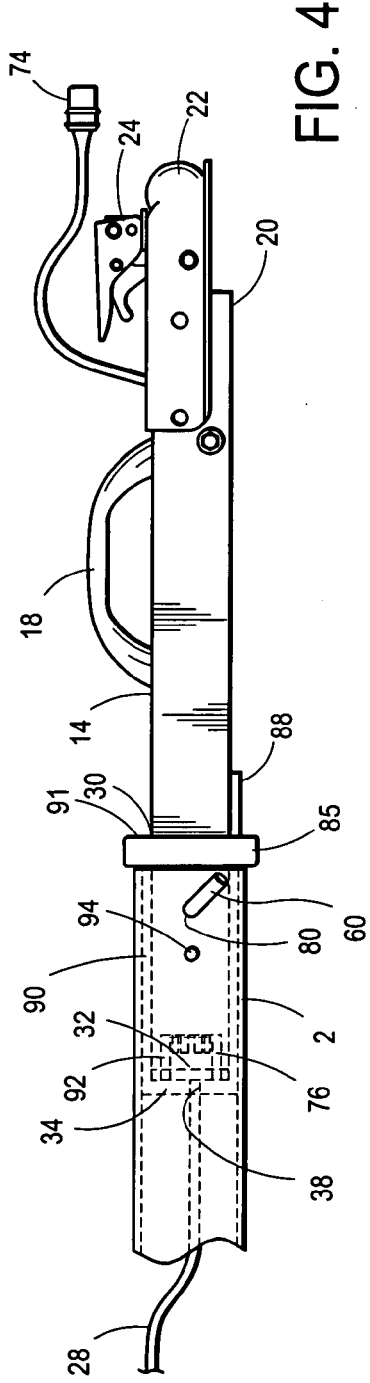

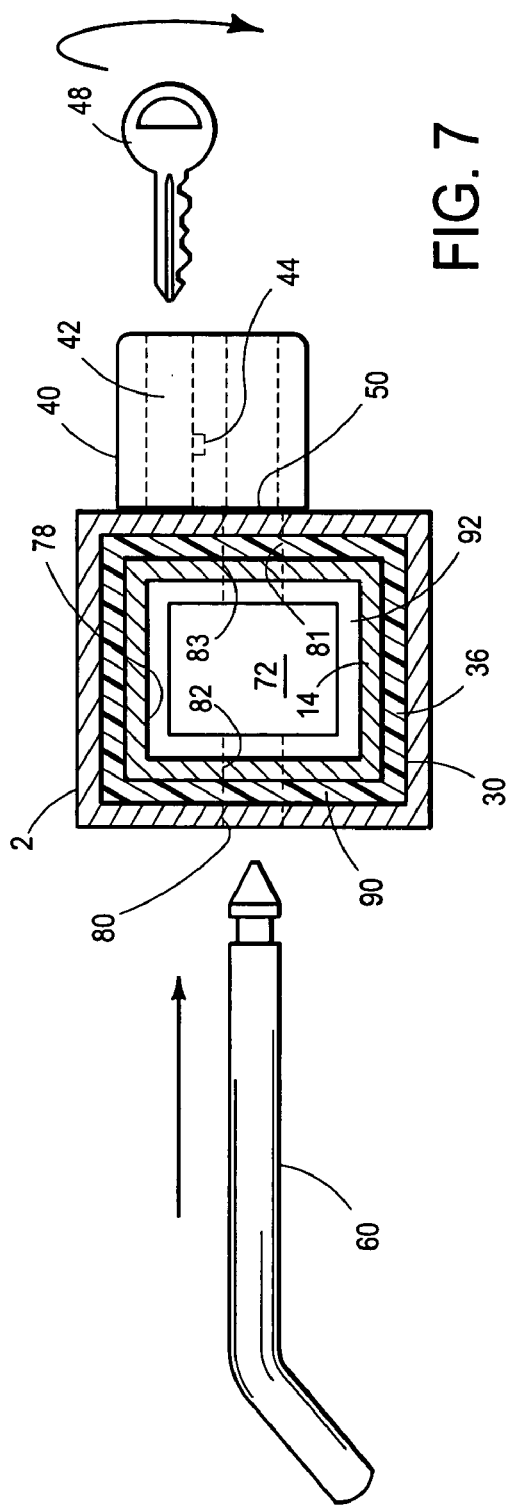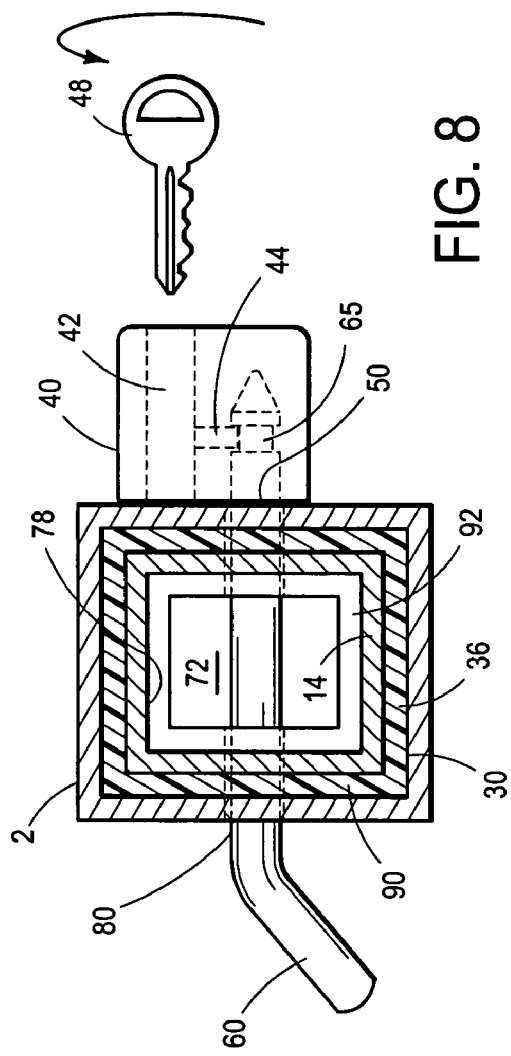

LOCKING TRAILER TONGUE EXTENSION ASSEMBLY

FIELD OF THE INVENTION

This invention relates generally to trailer tongues and, in particular, to trailer tongue extension assemblies.

BACKGROUND OF THE INVENTION

Trailers are used to tow boats, off road vehicles, motorcycles, campers, snowmobiles, and other recreational and work equipment. Generally, the trailer is connected by a tongue to a towing vehicle such as a pickup, truck, sports utility vehicle, or car. The trailer tongue is connected to the towing vehicle by a hitch on the end of the tongue that connects with a matching hitch on the towing vehicle. In this way the trailer and its contents, for example a boat or other equipment, can be towed to a lake, worksite, or campsite for use.

Trailers also have electrical wiring connected to their rear lights and safety equipment. This electrical wiring must be connected, usually by a plug, to the electrical system of the towing vehicle. Such connection permits the towing vehicle to energize the lights and safety equipment of the trailer when it and/or its contents are being towed on roads and highways. In other words, the break lights, backup lights, turn indicators, running lights, and such other safety devices of the trailer are made to operate in accord with the actions of the towing vehicle's own signals and devices.

When the trailer and it contents are not in use they are frequently stored in a garage or other enclosure to protect them from the both elements and theft. Trailer tongues must be of sufficient length to maintain a proper distance between the towing vehicle and the trailer. More specifically, if the trailer tongue is too short, the towing vehicle will not be permitted to affectively turn as the rear of the vehicle binds against the front of the trailer. To permit a desirable turning characteristics, the trailer tongue is typically extended from the body of the trailer.

One problem with the trailer tongues is that they are frequently too long to fit in the garages in which the trailer and its contents are being stored. The trailer may, for example fit in the garage, but the length of the tongue is such that it sticks out from the garage and prevents the garage door from being shut to secure the trailer and its contents.

In view of this, it is useful for trailer tongues to have removable extensions that can be connected to the trailer tongue when the trailer and its contents are being towed and disconnected when the trailer and its contents are in storage, thus shortening the overall length of the trailer and tongue. Another advantage of trailer tongue extensions is that they can be removed when the trailer is at a worksite, campsite, lake, or storage garage to prevent thieves from connecting the trailer to their own vehicles and towing them away. The trailer tongue extension is secured to the trailer tongue by a pin that extends through both the tongue extension and the trailer tongue.

Where a trailer tongue extension system is employed, current systems mandate that the electrical wiring must either bypass, and be manually connected outside of, the extension or have an additional manual connection outside of the tongue at or near the location where the tongue extension fits into the trailer tongue. Such connections expose additional portions of the wiring to the elements and subject them to damage at lake, campsites, or work sites. Further, with an exposed harness it is possible that ground debris such as plants or shrubs may snag the passing harness and un-couple the connectors. In addition, the introduction of multiple sets of connectors introduce more opportunity for connectivity failure, due, for example, to corrosion or improper fitting and bending. And, of course, an operator can forget to connect the wiring once the tongue extension is engaged.

In further addition, should the connection inadvertently separate it is likely that at least one connector and wire harness will drag on the ground as the trailer is towed. Such dragging may quickly result in a connector that is beyond use, a potential dangerous condition for the transport of the trailer as well as costly in time and resources to remedy.

It is also desirable and useful to be able to lock trailer extensions onto the trailer tongue when they are connected and lock them out of a trailer tongue when they are disconnected and not in use. This may be accomplished by a key-operated, spring-biased lock assembly that causes a lock pin to be inserted in a groove or slot in the tongue pin, which is inserted through the trailer tongue and trailer extension. Such locks prevent the tongue from being removed by thieves and prevent thieves or other unauthorized persons from connecting the tongue extension to the trailer tongue when the tongue extension is not connected to, or removed from, the trailer tongue.

However, even with such removal of the trailer tongue extension, the electrical wire harness remains at issue. There may be short pig-tail harness that should be stored as well. In addition, the remaining plug on the trailer, may become fouled with debris during storage. Further, as the plug is fully exposed it provides no additional theft deterrence.

Hence, there is a need for an improved trailer tongue extension assembly which overcomes one or more the drawbacks identified above. The present invention accomplishes this objective.

SUMMARY OF INVENTION

The invention provides an improved trailer tongue extension assembly.

In particular, and by way of example only, according to an embodiment of the present invention, this invention provides a trailer tongue extension assembly including: a tubular trailer tongue having a removable extension; a first electrical connector disposed within the trailer tongue; and a second electrical connector disposed within the removable extension; wherein the first and second electrical connectors engage and disengage as the removable extension is installed or removed from the trailer tongue.

Moreover, according to an embodiment thereof, the invention may provide a trailer tongue extension assembly including: a tubular trailer tongue of a first size, having at least one open end and an internal channel (i.e., a hole in the tubular trailer tongue) at least partially along a longitudinal axis from the open end; a first electrical connector disposed within the internal channel or hole in the tongue; a tubular tongue extension of a second size, having a mating end structured and arranged to slip fit into the opening of the trailer tongue, and a second electrical connector disposed at least partially within the mating end and structured and arranged to mate with the first electrical connector; and a binder or attacher configured to bind the tongue extension to the trailer tongue when the tongue extension is slip-fit into the trailer tongue.

In yet another embodiment thereof, the invention may provide a trailer tongue extension assembly including a trailer tongue forming a longitudinal inside opening. The trailer tongue has a first electrical plug attached to an inside wall of the longitudinal inside opening. A tongue extension sized to slide into the longitudinal inside opening. The tongue extension has a second electrical plug attached to the end so that when tongue extension slides into the longitudinal opening of the trailer tongue the second electrical plug mates with the first electrical plug.

These and other features and advantages of the preferred apparatus and method will become apparent from the following detailed description taken in conjunction with the accompanying drawings which illustrate, by way of example the principles of the invention

BRIEF DESCRIPTION OF THE DRAWINGS

FIG. 1 is a top view of an inventive trailer tongue extension assembly showing a tongue extension separated and disconnected from a trailer tongue and a pin outside of, and disconnected from, the trailer tongue, the tongue extension, and a locking assembly; a key is shown inserted in the locking assembly; and dashed lines show plugs installed inside the trailer tongue and tongue extension;

FIG. 2 is a top view of the inventive trailer tongue extension assembly showing the tongue extension inserted into and connected to the trailer tongue and, via dashed lines, the pin inserted into and through the trailer tongue and tongue extension and into the locking assembly; the key is removed and separate from the lock assembly; and dashed lines also show the trailer tongue plug and the tongue extension plugs mated and connected;

FIG. 3 is a side view of the trailer tongue and tongue extension of FIGS. 1 and 2 showing the tongue extension separated from and disconnected from the trailer tongue;

FIG. 4 is a side view of the trailer tongue and tongue extension of FIGS. 1 and 2 showing the tongue extension inserted into and connected to the trailer tongue and the pin inserted into and through the trailer tongue and tongue extension and into the locking assembly; dashed lines also show the trailer tongue plug and the tongue extension plugs mated and connected;

FIG. 7 is a cross sectional view of the trailer tongue extension assemble taken along lines 7—7 of FIG. 5 showing the pin outside of and disconnected from the trailer tongue assembly;

FIG. 8 is a cross sectional view of the trailer tongue extension assemble taken along lines 8—8 of FIG. 6 showing the pin inserted through the trailer tongue and tongue extension and into the locking assembly.

DETAILED DESCRIPTION

Figure 5:
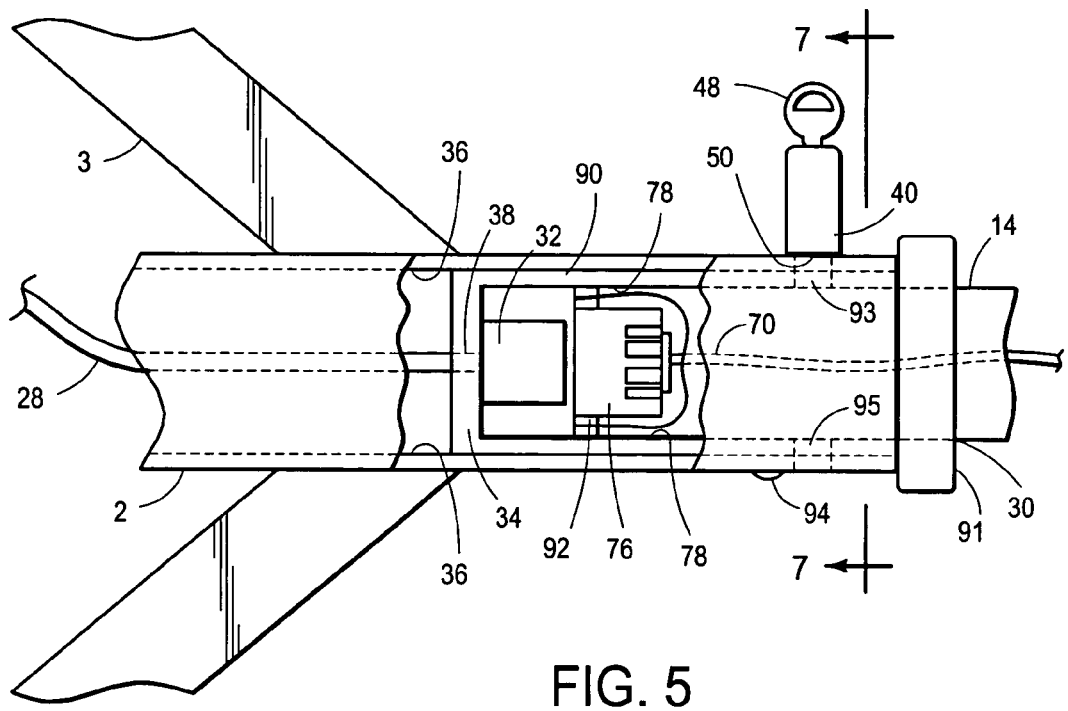
FIG. 5 is a top view of a portion of the trailer tongue extension assembly showing the tongue extension inserted part of the way into the trailer tongue; a broken away portion shows the plugs of the trailer tongue and tongue extension in close proximity, but unconnected.

Before proceeding with the detailed description, it is to be appreciated that the present invention is not limited to use or application in conjunction with a specific type of locking trailer tongue extension assembly. Thus, although the present invention is, for the convenience of explanation, depicted and described with respect to typical exemplary embodiments, it will be appreciated that this invention may be applied with other types of locking trailer tongue extension assemblies.

Turning now to the drawings, FIGS. 1, 2, 3 and 4 show a locking trailer tongue extension assembly 1 embodying the present invention. The trailer tongue extension assembly 1 has a tubular trailer tongue 2 connected to a trailer part 3 of trailer (not shown), a removable tubular trailer tongue extension 14, and an attacher 60. The tubular trailer tongue has at least one open end 30, and an internal channel 72 at least partially along a longitudinal axis from the open end 30. A first electrical connector is disposed within the internal channel. In at least one embodiment, the electrical connector 32 is a plug, appropriate oriented towards the open end 30.

The tubular trailer tongue extension 14 has a mating end 16 structured and arranged to slip fit into the open end 30 of the trailer tongue 2. A second electrical connector 76 is disposed at least partially within the mating end 16 and is structured and arranged to mate with the first electrical connector 32. In at least one embodiment the second electrical connector 76 is a mating plug to electrical connector 32. A handle 18 is provided on the tongue extension 4 to lift it into place, slide it into and out of the trailer tongue 2, and move it from one location to another.

As illustrated in FIG. 2, when the tongue extension 14 is slip fit into the opening 30 of the trailer tongue 2 to assemble the tongue extension assembly 1, the electrical connectors 38 and 76 are mated. It is to be appreciated that in assembled form, the electrical connectors 38 and 76 are advantageously enclosed within the assembly, protecting them from road and ground debris as well as weather and or other elements.

Figure 6:
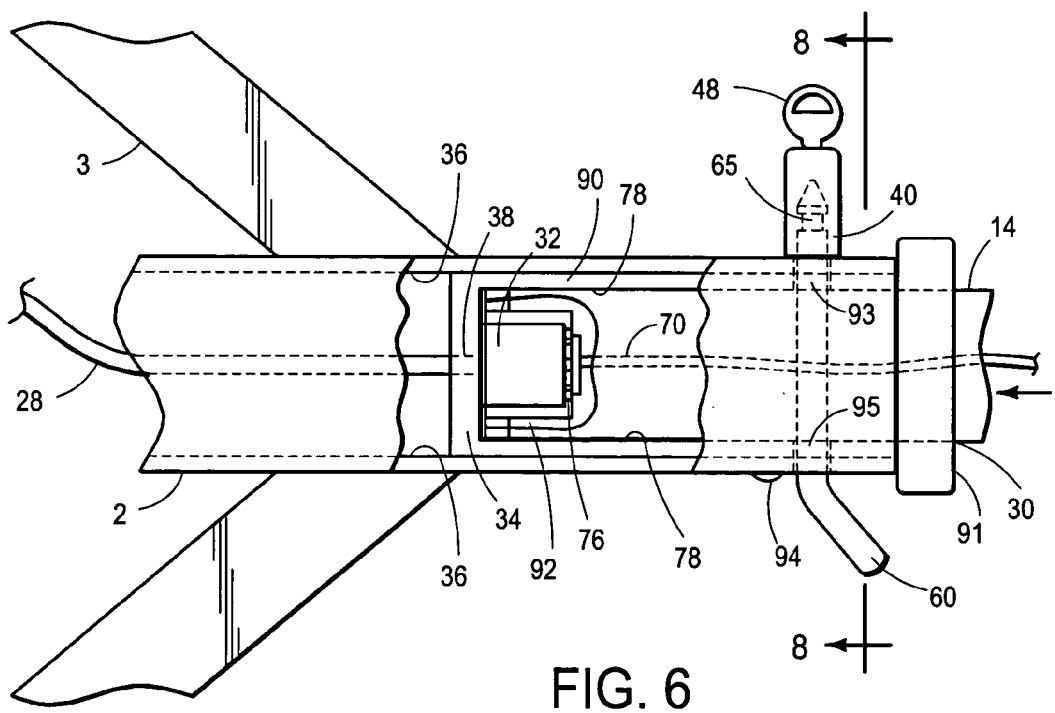
FIG. 6 is a top view of a portion of the trailer tongue extension assembly showing the tongue extension fully inserted into the trailer tongue; a broken away portion shows the plugs of the trailer tongue and tongue extension mated and connected.

As best shown in FIGS. 5 and 6, the electrically operated lights and other equipment on the trailer (not shown) are attached to electrical wires or wiring 28. Wiring 28 is extended through a hole 38, provided in trailer tongue support 34, and connected to the first electrical connector 32 that is attached to a trailer tongue support 34. Trailer tongue support is in turn firmly attached to the inside walls 36 of the inside of the trailer tongue 2. As noted below, the first electrical connector 32 may also be attached to a removable holder [90] that slides into the open end 30 in the tongue 2.

Electrical wires or wiring 70 is also run through the tubular tongue extension 14. As shown in FIGS. 1 and 2, the wiring 70 exits the tongue extension through an opening (not shown) near the hitch 22 and is connected to a connector 74 that may be attached to a mating connector (not shown) in or on the towing vehicle. The other end of the wiring 70 that runs through the inside of the tongue extension 14 is connected to the second electrical connector 76. With respect to FIGS. 5 and 6, electrical connector 76 is attached to a support that is in turn attached to the inside walls 78 of the tongue extension 14 (attachment not shown). As noted below, the second electrical connector 76 may also be attached to a removable holder [92] that slides into the mating end 16 of the tongue extension 14.

As noted above, the second electrical connector 76 is shaped such that it mates with trailer tongue plug 32. When the electrical connectors 76 and 32 are mated, the electrical wiring 28 of the trailer is connected to the electrical wiring harness of the towing vehicle, such that the vehicle electrical harness provides electricity to the trailer electrical harness 28. As such, the towing vehicle is capable of energizing and operating the lights and other equipment in or connected to the trailer 3.

As may be appreciated from the illustration, the first electrical connector 32 is substantially inaccessible from the open end without the trailer tongue extension 14. As such, during periods of storage, the first electrical connector is protected. In addition, the integral internal placement of the first electrical connector 32 serves as a theft deterrent for the connector and can not easily be reached for connection by anything other than the tongue extension 14. In at least one embodiment, electrical connector 38 may be keyed to mate only with the second electrical connector 76 of the tongue extension 14. Such keyed mating advantageously assists in theft deterrence, for without a mating connector the electrical wiring 28 of the trailer will not be activated by the towing vehicle.

An opposite vehicle connection end 20 (i.e., opposite the mating end 16) of the tongue extension 14 is provided with a hitch 22 and hitch clamp 24 so that the tongue extension 14 can be connected to a hitch (not shown) on the towing vehicle (not shown) that fits within the hitch 22 on the tongue extension 14 and may be clamped or otherwise secured thereto for towing.

As shown in FIGS. 1, 2, 4, 7 and 8, the tongue extension assembly 1 includes an attacher 60 structured and arranged to attach the tongue extension 14 to the trailer tongue 2. In at least one embodiment, the attacher is a tongue pin 60 passing through an aligned set of holes (80, 81, 82, and 83) in the trailer tongue 2 and the trailer extension 14. More specifically, holes 80 and 81 are positioned substantially in line to one another on opposite sides of trailer tongue 2. Likewise holes 82 and 83 are positioned substantially in line to one another on opposite sides of trailer tongue extension 14.

When trailer tongue extension 14 is slip-fit into in the open end 30 and internal channel 72 of trailer tongue 2 such that the first and second electrical connectors 32 and 76 are properly mated, the holes 80, 81, 82 and 83 properly align to accept the insertion of trailer tongue pin 60. In at least one embodiment, the alignment of the holes 80–83 is substantially transverse to the longitudinal axis of the trailer tongue extension assembly 1. As shown, the attacher 60 ensures the first electrical connector 32 and the second electrical connector 76 remain mated when the tongue extension 14 is slip-fit into the open end 30 of the trailer tongue 2.

As best shown in FIGS. 7 and 8, in at least one embodiment, a lock assembly 40 is attached to the outside or trailer tongue 2. The locking mechanism 42 is shown schematically (via dashed lines) in FIGS. 7 and 8. Such lock mechanisms are common and known in the art. One such lock mechanism contains a lock pin 44 that is biased or spring-biased in the extend position, as shown in FIG. 8. As shown in FIG. 1, a key 48 is inserted into the lock mechanism of the lock assembly 40. When the key is turned and held against the bias of the lock mechanism 42, the lock pin 44 is retracted, as shown in FIG. 7. The locking assembly also has an interior slot or opening 50 into which a tongue pin 60 may be inserted.

In the exemplary lock assembly 40 and lock mechanism 42 described above, the tongue pin 60 has a slot or groove 65 into which the lock pin 44 is inserted when the key 48 is released or turned in the opposite direction from that in which it is turned when the lock pin 44 is retracted. When the lock pin 44 is inserted in the slot or groove 65 of the tongue pin 60, the tongue pin 60 cannot be removed or pulled out of from the slot or opening 50 in the lock assembly 40.

The exemplary lock assembly 40 is shown in the drawings and described above as attached to the trailer tongue 2; however, as may be apparent, it is not necessary to attach the lock assembly 40 to the trailer tongue 2. The lock assembly 40 may be separate from the trailer tongue 2 and used as described above. In such case, when the lock assembly tongue pin 60 is inserted through holes 80–83 and into the lock assembly 40, and the lock pin 60 is inserted in the tongue pin slot or groove 65, the lock assembly 40 locks the tongue pin 60 locks the trailer tongue 2 and trailer tongue extension 14 to one another regardless of whether the lock assembly 40 is attached to trailer tongue 2. When the key 48 is turned so that the lock pin is removed from the pin slot 65, and the tongue pin 60 is removed from holes 80–83, the lock assembly 40 may simply be reattached to the tongue pin 60 as described above without inserting the tongue pin through holes 80–83 and placed in a separate location for safe keeping.

Engaging the tongue pin 60 through holes 80 and 81 of the trailer tongue 2 and into the lock assembly 40, when the tongue extension 14 has been removed, is an advantageous theft deterrent. More specifically, the tongue pin 60 may be inserted through holes 80 and 81 in the trailer tongue 2 and then locked again as described above to prevent the tongue extension 14 (or the tongue extension of another trailer) from being inserted into the trailer tongue 2. The locked presence of the tongue pin 60 passing transversely through the internal channel 72 prevents mating between the first electrical connector 32 and the second electrical connector 76.

Of course, the tongue pin 60 could also be inserted through and locked in tongue extension 14 in the same manner as described above with respect to trailer tongue 2—i.e., by inserting and locking the tongue pin 60 through holes 82 and 83 of the tongue extension 14. In this case, the tongue extension could not be fully inserted into tongue 2, because the lock assembly 40 and tongue pin 60 so attached to the tongue extension 14 would not fit within the inside opening 30 in the tongue 2.

In a preferred embodiment of the trailer tongue extension assembly 1, the tongue plug 32 and the tongue extension plug 76 are installed in cup-like holders or containers 90 and 92, respectively, which are made of plastic or some other suitable material. The holder 90 has an inside longitudinal opening 91 that has an inside dimension sufficient to permit tongue extension 14 to be inserted therein. The container or holder 90 also has holes 93 and 95 that align with the holes 80–83 when the tongue extension 14 is fully inserted into the opening 91 of the holder 90. Specifically, the tongue plug 32 is installed in the cup like holder or container 90, which slides into the longitudinal opening 30 in the tongue 2. Tongue extension plug 76 is installed in cup-like holder or container 92, which slides into the longitudinal inside opening 72 of the tongue extension 14 at the insertion end 16 thereof. The cup-like holder or container 90 may be secured in may be secured in the tongue 2 by a set screw 94, and the cup-like container 92 may be secured in the tongue extension 14 by a set screw 96. An advantage of the use of the cup-like containers 90 and 92 is that the plug 32 with its connected wiring 28 and the plug 76 with its connected wiring 70 may be installed, respectively, in the cups 90 and 92 before the cups 90 and 92 are inserted in the longitudinal inside openings 30 and 32, respectively, of the tongue 2 and the tongue extension 14. Another advantage of the use of the cup-like holders 90 and 92 is that they may be easily removed for repair by undoing the respective set screws 94 and 96 and sliding the holders 90 and 92 out of the tongue 2 and tongue extension 14, respectively.

An end piece or sleeve 85 may be incorporated into the outer end of the cup- like holder or container 90 that is inserted into the longitudinal opening 30 in the tongue 2 attached to protect it from being damaged and to guide the tongue extension 14 into the inside opening 98 in the holder 90. Holder 92 may also have a lip or flange (not shown) that overlays or partly overlays the end of the tongue extension 14 so that the holder 92 does not slip too far into the longitudinal hole 72 of the tongue extension 14. As illustrated in FIGS. 3 and 4, in at least one embodiment, a stop 88 is attached to the bottom of the tongue extension 14 to prevent the tongue extension 14 from being inserted too far into trailer tongue 2 in order to prevent the electrical connectors 32 and 76 from being damaged during the insertion/attachment process.

Having described the above physical embodiment of the trailer tongue extension assembly 1, the advantages of the described embodiments may be more fully appreciated with a brief description of the trailer tongue extension assembly 1 use and operation.

When the trailer tongue extension assembly 1 is to be assembled, the mating end 16 of the tongue extension 14 is inserted into the open end 30 of the trailer tongue 2 or, in the preferred embodiment, passed into the longitudinal opening 91 of the cup-like holder or container 90 until the holes 82 and 83 of the tongue extension 14 are in alignment or register with holes 80 and 81 of the trailer tongue 2 and holes 93 and 95 of the cup-like container 90. The alignment of holes 80, 81, 82, 83, 93, and 95 may also serve as a visual indication to the user that electrical connectors 32 and 76 have mated.

The tongue pin 60 is then inserted through aligned holes 80, 81, 82, 83, 93 and 95 and into the lock assembly 40 while the key 48 of the lock assembly 40 is turned to retract the lock pin 44. When the tongue pin 60 is fully inserted in to the lock assembly 40, the key 48 is allowed to return to its original position such that lock pin 44 is inserted into the groove or slot 65 in the tongue pin 60, thus securing the tongue pin 60 in the lock assembly 40 and preventing the tongue extension 14 from being removed from the trailer tongue 2. The key 48 may then be removed for safekeeping.

The tongue extension 14 may be removed from the trailer tongue 2 in order to shorten the tongue extension assembly 1 so that it may be fully enclosed in a garage. The tongue extension 14 may also be removed from the trailer tongue 2 at a lake, campsite, or worksite to prevent unauthorized users from connecting the trailer 3 to a towing vehicle and/or removing the trailer 3 from the site. In either case, the key 48 is turned against the bias or the lock mechanism 42 so that the lock pin 44 is retracted out of the slot or groove in the tongue pin 60. The tongue pin 60 is then pulled out of the aligned holes 80–83, 93, and 95.

When the tongue pin 60 has been removed from the aligned holes 80–83 93, and 95, the tongue extension 14 may be pulled out of the trailer tongue 2, decoupling the enclosed and mated first and second electrical connectors 32 and 76. Removal of the tongue extender 14 shortens the overall length of the trailer tongue assembly 1 and may allows the trailer 3 to be enclosed in a garage or other storage facility that is shorter than the trailer 3 when the trailer tongue extension 14 installed in the trailer tongue 2.

In order to prevent an unauthorized user from using the trailer tongue extension 14 to remove the trailer 3 from the garage, or from a lakeside, campsite, or worksite, the tongue pin 60 may be inserted in the aligned holes 80, 81, 93 and 95 of the trailer tongue 2 or in the aligned holes 82–83 of the trailer tongue extension 14. As the lock pin 44 is inserted through holes 80–81, 93, and 95, or through 82–83, the key 48 of the lock assembly 40 is turned against the bias of the lock mechanism 42 to retract the lock pin 44. The tongue pin 60 is then fully inserted into the lock assembly 40, and the key 48 is allowed to return to its biased position so that the lock pin 44 with is inserted into the groove or slot in the tongue pin 60, thus securing the tongue pin 60 in the lock assembly 40.

In either position—i.e., inserted and locked in the trailer tongue 2 or the tongue extension 14—the tongue pin 60 prevents the tongue extension 14 from being reinstalled in the trailer tongue 2, thus preventing unauthorized use of the trailer tongue extension 14 or the removal of the trailer 3 from the its then location. Of course, the key 48 is removed from the lock mechanism 42 and the lock assembly 40 and kept in a location where it cannot be accessed or used by an unauthorized person.

Under appropriate circumstances, additional modifications may be made to the above described embodiments. For example, the tubular trailer tongue 2 and tubular tongue extension are cylindrical, having a substantially round cross section instead of a square cross section as shown in FIGS. 7 and 8. In addition, the cross section may be rectangular, triangular, or other shape as appropriate for the given circumstance. Further, after the tongue pin 60 is inserted through the aligned holes 80–83, 93 and 95 of the trailer tongue 2 and the tongue extension 14, it may be locked by inserting a padlock arm through a hole in the end of the tongue pin 60 that has been inserted through all of the aligned holes 80–83, 93, and 95.

While the invention has been described with reference to the preferred embodiment, it will be understood by those skilled in the art that various alterations, changes and improvements may be made and equivalents may be substituted for the elements thereof and steps thereof without departing from the scope of the present invention. In addition, many modifications may be made to adapt to a particular situation or material to the teachings of the invention without departing from the essential scope thereof. Such alterations, changes, modifications, and improvements, though not expressly described above, are nevertheless intended and implied to be within the scope and spirit of the invention. Therefore, it is intended that the invention not be limited to the particular embodiments disclosed as the best mode contemplated for carrying out this invention, but that the invention will include all embodiments falling within the scope of the appended claims.

We claim:

1. A trailer tongue extension assembly comprising:
    a tubular trailer tongue attached to a trailer, the tubular trailer tongue having a removable extension;
    a first electrical connector disposed within the trailer tongue; and
    a second electrical connector disposed within the removable extension;
    wherein the first and second electrical connectors engage and disengage as the removable extension is installed or removed from the trailer tongue.

2. The trailer tongue extension of assembly of claim 1 wherein the first electrical connector is disposed in a holder that is removably disposed within the trailer tongue.

3. The tongue extension assembly of claim 1, wherein the second electrical connector is disposed in a holder that is removably disposed within the removable extension.

4. The trailer tongue extension assembly of claim 1, wherein the first electrical connector and the second electrical connector are substantially enclosed within the assembly.

5. The trailer tongue extension assembly of claim 1, wherein the extension slip-fits into the tubular trailer tongue.

6. The trailer tongue extension assembly of claim 2, wherein the extension slip-fits into the holder.

7. The trailer tongue extension assembly of claim 1, further including an attacher configured to attach the removable extension to the trailer tongue.

8. The trailer tongue extension assembly of claim 1, wherein the first electrical connector and the second electrical connector are mated electrical plugs.

9. The trailer tongue extension assembly of claim 1, wherein the first electrical connector is keyed to mate only with the second electrical connector of the extension.

10. The trailer tongue extension assembly of claim 1, wherein the first electrical connector is inaccessible from an open end of the trailer tongue without the trailer tongue extension.

11. The trailer tongue extension assembly of claim 1, further including a trailer electrical harness connected to the first electrical connector and a towing vehicle electrical harness connected to the second electrical connector.

12. The trailer tongue extension assembly of claim 11, wherein when assembled, the vehicle electrical harness provides electricity to the trailer electrical harness.

13. The trailer tongue extension assembly of claim 1, further including a lock structured and arranged to lock a tongue pin in place as it is passed through aligned holes of the trailer tongue and removable extension.

14. The trailer tongue extension assembly of claim 1, wherein the tubular trailer tongue and removable extension have a substantially rectangular cross section.

15. The trailer tongue extension assembly of claim 1, wherein the tubular trailer tongue and removable extension have a substantially square cross section.

16. A trailer tongue extension assembly comprising:
   a tubular trailer tongue attached to a trailer, the tubular trailer tongue having at least one open end and an internal channel at least partially along a longitudinal axis from the open end;
   a first electrical connector disposed within the internal channel;
   a tubular tongue extension having a mating end structured and arranged to slip fit into the open end of the trailer tongue, and
   a second electrical connector disposed at least partially within the mating end and structured and arranged to mate with the first electrical connector; and
   an attacher configured to attach the tongue extension to the trailer tongue when the tongue extension is slip-fit into the trailer tongue.

17. The trailer tongue extension assembly of claim 16, wherein the first electrical connector and the second electrical connector are mated electrical plugs.

18. The trailer tongue extension assembly of claim 16, wherein the electrical connectors are enclosed within the tongue extension assembly when assembled.

19. The trailer tongue extension assembly of claim 16, wherein the first electrical connector is keyed to mate only with the second electrical connector of the tubular tongue extension.

20. The trailer tongue extension assembly of claim 16, wherein the first electrical connector is inaccessible from the open end without the trailer tongue extension.

21. The trailer tongue extension assembly of claim 16, wherein engaging the attacher when the tongue extension is removed from the open end of the trailer tongue prevents mating between the first and second electrical connectors.

22. The trailer tongue extension assembly of claim 16, wherein the attacher ensures the first electrical connector and the second electrical connector remain mated when the tongue extension is slip-fit into the opening of the trailer tongue.

23. The trailer tongue extension assembly of claim 16, further including a trailer electrical harness connected to the first electrical connector and a towing vehicle electrical harness connected to the second electrical connector.

24. The trailer tongue extension assembly of claim 23, wherein when assembled, the vehicle electrical harness provides electricity to the trailer electrical harness.

25. The trailer tongue extension assembly of claim 16, wherein the tubular trailer tongue and tubular trailer extension have a substantially rectangular cross section.

26. The trailer tongue extension of assembly of claim 16, wherein the first electrical connector is disposed in a holder that is slip-fit into the internal channel of the trailer tongue.

27. The tongue extension assembly of claim 16, wherein the second electrical connector is disposed in a holder that is slip-fit into an opening in the mating end of the removable extension.

28. A trailer tongue extension assembly comprising:
   a tubular trailer tongue having a removable extension;
   a first electrical connector disposed in a holder that is removably disposed within the trailer tongue; and
   a second electrical connector disposed within the removable extension;
   wherein the first and second electrical connectors engage and disengage as the removable extension is installed or removed from the trailer tongue.

29. A trailer tongue extension assembly comprising:
   a tubular trailer tongue having a removable extension;
   a first electrical connector disposed within the trailer tongue; and
   a second electrical connector disposed in a holder that is removably disposed within the removable extension;
   wherein the first and second electrical connectors engage and disengage as the removable extension is installed or removed from the trailer tongue.

30. A trailer tongue extension assembly comprising:
   a tubular trailer tongue having a removable extension;
   a first electrical connector disposed within the trailer tongue;
   a second electrical connector disposed within the removable extension; and
   a lock structured and arranged to lock a tongue pin in place as it is passed through aligned holes of the trailer tongue and removable extension;
   wherein the first and second electrical connectors engage and disengage as the removable extension is installed or removed from the trailer tongue.

31. A trailer tongue extension assembly comprising:
   a tubular trailer tongue having at least one open end and an internal channel at least partially along a longitudinal axis from the open end;
   a first electrical connector disposed within the internal channel;
   a tubular tongue extension having a mating end structured and arranged to slip fit into the open end of the trailer tongue, and
   a second electrical connector disposed at least partially within the mating end and structured and arranged to mate with the first electrical connector;
   an attacher configured to attach the tongue extension to the trailer tongue when the tongue extension is slip-fit into the trailer tongue;

wherein the attacher is a tongue pin passing through an aligned set of holes in the trailer tongue and the trailer extension.

32. A trailer tongue extension assembly comprising:

a tubular trailer tongue having at least one open end and an internal channel at least partially along a longitudinal axis from the open end;

a first electrical connector disposed within the internal channel;

a tubular tongue extension having a mating end structured and arranged to slip fit into the open end of the trailer tongue, and a second electrical connector disposed at least partially within the mating end and structured and arranged to mate with the first electrical connector;

a lock structured and arranged to lock a tongue pin in place as it is passed through an aligned set of holes in the trailer tongue and trailer extension when the tongue extension is slip-fit into the trailer tongue.

33. A trailer tongue extension assembly comprising:

a tubular trailer tongue having at least one open end and an internal channel at least partially along a longitudinal axis from the open end;

a first electrical connector disposed in a holder that is slip-fit into the internal channel;

a tubular tongue extension having a mating end structured and arranged to slip fit into the open end of the trailer tongue, and a second electrical connector disposed in a holder that is slip-fit into an opening in the mating end and structured and arranged to mate with the first electrical connector, and an attacher configured to attach the tongue extension to the trailer tongue when the tongue extension is slip-fit into the trailer tongue.

* * * * *